United States Patent [19]

Dillenburg et al.

[11] 4,117,087

[45] Sep. 26, 1978

[54] PROCESS FOR PREPARING STABILIZED SODIUM PERCARBONATE

[75] Inventors: Helmut Dillenburg, Rheinbrohl; Wilhelm Moser, Ariendorf b. Hoenningen, both of Fed. Rep. of Germany; Robert Jones, Brussels, Belgium

[73] Assignee: Peroxid-Chemie GmbH., Minich, Fed. Rep. of Germany

[21] Appl. No.: 797,757

[22] Filed: May 17, 1977

[30] Foreign Application Priority Data

May 20, 1976 [DE] Fed. Rep. of Germany ....... 2622458

[51] Int. Cl.$^2$ ............................................. C01B 15/10
[52] U.S. Cl. ................................. 423/275; 423/415 P
[58] Field of Search ................... 423/415, 415 P, 265, 423/275

[56] References Cited

U.S. PATENT DOCUMENTS

| 1,225,722 | 5/1917 | Schaidhauf | 423/415 P |
| 2,448,058 | 8/1948 | Slater et al. | 423/415 P |
| 2,541,733 | 2/1951 | Young | 423/415 P |
| 3,860,694 | 1/1975 | Jayawant | 423/415 P |

Primary Examiner—Earl C. Thomas
Attorney, Agent, or Firm—Bacon & Thomas

[57] ABSTRACT

Stabilized crystalline sodium percarbonate is prepared by reacting a soda solution or suspension, which has a pH value of between 10 and 11 and contains an amount of a soluble silicate, e.g., sodium waterglass, which is equivalent to from about 0.2 to about 0.9% of $SiO_2$ relative to the sodium percarbonate, with a hydrogen peroxide solution which contains a heavy metal complexing agent, allowing to crystallize at least 50% of the sodium percarbonate and then adding to the resulting suspension a second amount of a water soluble silicate which is equivalent to from about 0.2 to about 0.8% of $SiO_2$ relative to the sodium percarbonate and is sufficient to provide a silicate content in the final product equivalent to 0.5 to 1.5% of $SiO_2$.

17 Claims, No Drawings

PROCESS FOR PREPARING STABILIZED SODIUM PERCARBONATE

BACKGROUND OF THE INVENTION

In modern detergents, sodium percarbonate is increasingly used as a bleaching component in addition to sodium perborate because of its tendency to release active oxygen. However, the release of oxygen should not occur prematurely and thus a stabilizer which regulates the release of oxygen is added to these compounds. It is an important task to stabilize such a compound to such an extent that it can be stored both separately and in contact with the usual detergent components without significant losses of active oxygen.

The problem of stabilizing sodium perborate has been solved to a great extent. This stabilization is effected by adding a known stabilizer, such as, for example, magnesium sulfate, sodium silicate, ethylenediaminetetraacetic acid and others, during the manufacturing process. However, these stabilizing processes cannot be applied to sodium percarbonate in the same manner. This is partly due to the different molecular structure of the percarbonate and partly due to the fact that the process of crystallization from solutions or suspensions can easily be disturbed by the addition of foreign substances so that crystals are formed which are unsuitable for practical uses. The technique of stabilizing percarbonate with silicates which until now has been widely used, has not yet led to satisfactory results.

A common process for manufacturing sodium percarbonate comprises reacting a hydrogen peroxide solution with a sodium carbonate solution or suspension possibly with the simultaneous addition of sodium chloride for salting out the percarbonate and recycling the resulting mother liquor into the process after the crystallized sodium percarbonate has been separated. In this process waterglass can be added to the sodium carbonate solution or suspension as a stabilizer.

Various difficulties are connected with the addition of the waterglass solution before or during the crystallization process. If the quantity added is small, the crystallization is not adversely affected by a precipitation of insoluble silicates, but the resulting end products are not sufficently stabilized. If the quantity added is relatively high, the resulting products have a satisfactory stability but there are problems in carrying out the process. The crystallization process is disturbed; an undesirable amount of fine particles is formed, and nuclei formation and crystal growth occur largely in an uncontrolled manner. This leads to disturbances in the production process and the dehydration of the resulting percarbonate crystal suspension becomes difficult. If further quantities of waterglass are added, the above difficulties become even more pronounced and the chemical stability of the percarbonate again decreases.

Until now, therefore, it was not possible to provide the trade with a percarbonate satisfying high stability requirements in industrially needed quantities.

SUMMARY OF THE INVENTION

It is an object of the present invention to provide a process for preparing a substantially crystalline stabilized sodium percarbonate wherein a stabilizing amount of silicate is added without disturbing the crystallization process.

It is a further object of the present invention to provide such a process wherein the crystallization can be effected on a sufficiently large industrial scale.

It is a further object to provide such a process wherein the formation of an undesirable portion of fine particles is avoided.

It is still a further object of the present invention to provide an effectively stabilized sodium percarbonate product which is free flowing, especially a product containing spheroidal crystals.

It is yet a further object of the present invention to provide such a sodium percarbonate product which does not have any tendency for dust formation.

In order to accomplish the foregoing objects, there is provided a process for preparing a stabilized crystalline sodium percarbonate, comprising the steps of: preparing an aqueous medium containing sodium carbonate, e.g., an aqueous sodium carbonate solution or suspension, and having a pH value of between about 10 and about 11, preferably between about 10.3 and about 10.8; adding to the aqueous medium an amount of a water soluble silicate, e.g., an alkali metal silicate such as sodium or potassium silicate, which is equivalent to from about 0.2 to about 0.9% by weight of $SiO_2$ relative to the amount of the sodium percarbonate to be formed; reacting the resulting aqueous medium with an aqueous hydrogen peroxide solution, which contains a heavy metal complexing agent, whereby a reaction mixture containing sodium percarbonate is formed; allowing to crystallize at least about 50% of the sodium percarbonate within the reaction mixture; adding to said suspension an amount of a water soluble silicate which is equivalent to from about 0.2 to about 0.8% by weight of $SiO_2$, relative to the total amount of sodium percarbonate and which is sufficient to provide for a total content of silicate in the final crystalline product which is equivalent to from about 0.5 to about 1.5% by weight of $SiO_2$, relative to the amount of sodium percarbonate; allowing to crystallize a substantial amount of the crystallizable sodium percarbonate within said suspension; and, recovering a crystalline sodium percarbonate from said suspension.

According to the present invention, there is further provided a stabilized substantially crystalline sodium percarbonate comprising spheroidal crystals of sodium percarbonate having a silicate content equivalent to 0.5 to 1.5% of $SiO_2$, wherein part of the silicate is provided by water soluble sodium silicate embedded in the inner portion of the crystals and part of the silicate is provided by sparingly soluble polymeric silicic acid incorporated into the outer layer of the crystals.

Further objects, features, and advantages of the present invention will become apparent from the detailed description of the invention and its preferred embodiments which follows.

DETAILED DESCRIPTION OF PREFERRED EMBODIMENTS

It has been found that the difficulties connected with the stabilization of sodium percarbonate by means of silicates are avoided when the soluble silicate compound, preferably sodium waterglass or potassium waterglass, are introduced into the process in two stages and during the first stage, the pH value is adjusted, e.g., by adding an appropriate amount of a sodium hydroxide solution.

According to the process of the present invention sodium percarbonate is stabilized during its manufacture from a soda solution or suspension and a hydrogen peroxide solution by adding a soluble silicate to the reaction medium at two different stages, characterized in that in the first stage a quantity of a soluble silicate compound equivalent to from about 0.2 to about 0.9% by weight SiO$_2$ calculated on sodium percarbonate is added to the soda solution or suspension which has a pH value of between about 10 and about 11. Then, in a second stage, after the hydrogen peroxide solution containing a heavy metal complexing agent has been added and at least about 50%, e.g., between about 50 and about 90%, preferably between about 70 and about 80% of the sodium percarbonate has crystallized, a quantity of a soluble silicate compound equivalent to from about 0.2 to about 0.8% by weight SiO$_2$ calculated on the total sodium percarbonate present, is added to the sodium percarbonate suspension so that the total amount of the added soluble silicate is such that the silicate content in the final product is equivalent to from about 0.5 to about 1.5, and preferably 0.6 to 0.9% by weight SiO$_2$.

In the first stage, the soluble silicate, e.g., sodium waterglass or potassium waterglass, is added to the sodium carbonate solution or suspension which is prepared for the precipitation of percarbonate, in quantities equivalent to from about 2 to about 9 g SiO$_2$/kg percarbonate.

Furthermore, if the pH value of the soda suspension is not within the range of about 10 to about 11 it is adjusted preferably by means of a solution of sodium hydroxide to a value of from about 10 to about 11, preferably from about 10.3 to about 10.8. Thereby the sodium bicarbonate which is present in the solution is converted into soda and water according to the equation:

$$HCO_3^- \rightarrow H^+ + CO_3^{2-}$$

$$H^+ + OH^- \rightarrow OH_2$$

yet there is no excess of sodium hydroxide in solution.

Thus, it is guaranteed that a sufficient quantity of H$^+$ ions is removed from the reaction medium and the added silicate, e.g., waterglass, is maintained in solution in form of Na$_2$SiO$_3$. The otherwise occurring formation of H$_2$SiO$_3$ according to the equation:

$$SiO_3^{2-} + 2H^+ \rightarrow H_2SiO_3$$

and a subsequent separation of polymeric insoluble silicic acid which would disturb the crystallization of percarbonate, are prevented. The limitation of the amount of soluble silicate, e.g., waterglass in the reaction medium to an amount equivalent to about 2 – 9g SiO$_2$/kg sodium percarbonate favors the stabilization of the silicate solution, that is it prevents the formation of insoluble silicic acid which would disturb the crystallization process.

In the second stage, a further quantity of soluble silicate, e.g., waterglass, up to a concentration equivalent to from about 2 to about 8 g of SiO$_2$/kg sodium percarbonate is introduced into the sodium percarbonate suspension after at least about 50% and preferably about 70% of the sodium percarbonate have crystallized. Under the conditions which are present in the percarbonate suspension, the soluble silicate, e.g., waterglass, polymerizes to a large extent into sparingly soluble polymeric silicic acid and is embedded into the outer layers of the percarbonate crystals. At this stage precipitating silicic acid can no longer have a disturbing effect on the percarbonate crystallization. In this way, it is achieved that a soluble sodium silicate is embedded within the inner portion of the crystals, and thus can fully develop its stabilizing effect, whereas due to the polymeric silicic acid embedded into the outer layer of the crystals, the percarbonate is protected against outer influences which might have an adverse effect on its stability.

In order to improve the stabilizing effect of silicates on active oxygen, conventional heavy metal complexing agents such as phosphonic acids, ethylenediaminetetraacetic acid and its disodium salt, nitrilotriacetic acid and the like, are added to the hydrogen peroxide solution which is prepared for the precipitation of percarbonate. Generally, concentrations of from about 1 to about 5 g of a complexing agent and preferably from about 1 to about 2 g/kg percarbonate are sufficient. Suitable phosphonic acids are alkyl-, amino or hydroxy alkyl phosphonic acids or alkylene-, hydroxy or amino alkylene diphosphonic acids, wherein the alkyl- or alkylene groups contain between 1 and 6, preferably 2 or 3 carbon atoms or aryl mono-, di- or triphosphonic acids wherein the aryl group contains between 6–10 carbon atoms and preferably is a phenyl-, naphthyl- or phenyl lower alkyl group.

In order to increase the stability even further, it can be advantageous to add a magnesium compound, for example, magnesium salts, such as, magnesium sulfate, to the hydrogen peroxide solution.

In order to develop a favorable crystalline form it is recommended that a salt of a polymeric phosphoric acid, preferably a metaphosphoric acid, such as alkali metal salts, e.g., sodium hexametaphosphate, be added to the sodium carbonate solution or suspension as is described in the DOS 23 28 803, the disclosure of which is hereby incorporated by reference.

Preferably, at least a portion of the mother liquor which has been obtained within a previous sodium percarbonate crystallization process is used for preparing the sodium carbonate solution or suspension in the first step of the process according to the present invention.

According to a preferred embodiment of the invention the process for preparing the crystalline stabilized sodium percarbonate is carried out continuously. The silicate containing sodium carbonate solution or suspension and the hydrogen peroxide solution are simultaneously and continuously introduced into an agitator which, when starting the process contains water and later on when crystallization begins and proceeds contains a certain amount of sodium percarbonate suspension.

The residence time of the reaction mixture in the agitator is adjusted so that after at least 50% and preferably at least 70% of the sodium percarbonate which will crystallize due to its solubility product has precipitated the sodium percarbonate suspension is continuously conveyed from the agitator into a refrigerated agitator where the suspension is cooled and a waterglass solution is added continuously in an amount so that the final product contains about 0.5 to about 1.5%, preferably 0.6 to 0.9% SiO$_2$. The crystal suspension is continuously removed from the refrigerated agitator and the crystals are separated from the mother liquor and subsequently dried. The mother liquor is recycled into the process by using it for the preparation of fresh soda solution or suspension.

The concentration of the reaction solutions is not critical; it is determined by economic aspects. The concentration of hydrogen peroxide solution may be between about 50 and 70%, i.e., between about 596 g and 900 g $H_2O_2$ per liter. When using a hydrogen peroxide solution having a concentration above 75% the total amount of mother liquor is recycled but no excess which must be eliminated is obtained. Soda solutions or suspensions having a $Na_2CO_3$ content of 170 to 260 g/l are suitable and the waterglass solution may have a concentration of between 20 to 40%.

According to the process of the invention, a sodium percarbonate having an advantageous crystal form is obtained which is sufficiently stable to meet practical requirements. The crystals have a spheroidal shape. Therefore, the product is free flowing, it readily sedimentates in the percarbonate slurry, thus it can be easily separated from the mother liquor, dehydrated, and dried. No dust formation occurs during the handling of the product. In contrast thereto, usual known processes yield dendritic crystals which have a tendency to dust formation an which are difficult to separate from the mother liquor and to dry. The chemical stability of the percarbonate can be determined by various analytical methods. In the examples below, two methods are chosen. The stability in a dried product at a high temperature is determined by percentage of active oxygen loss in the sample after a storage time of 2 hours at 105° C by one method. The sensitivity towards metallic impurities brought in from outside is determined by the second method. Determination of the period of time which passes before a sample, which was mixed with 10% of an aqueous solution containing 530 ppm $Fe^{3+}$ in form of ferric chloride in a 500 ml Dewar vessel reaches a temperature of 100° C as a result of decomposition. A percarbonate can be regarded as a well stabilized end product if losses of below 10% are recorded in the first test and periods of time over 72 hours are recorded in the second test (warm storage test).

The invention will now be further described by the following examples which are intended to be illustrative only.

EXAMPLE 1

A sodium percarbonate suspension containing 210 g of sodium percarbonate per liter is placed in an agitator. The temperature is maintained at 17° C.

Under stirring and cooling, a hydrogen peroxide solution containing 596 g $H_2O_2$ per liter, and 2 g/l of 1-hydroxyethane-1,1-diphosphonic acid and a soda suspension containing 220 g/l of $Na_2CO_3$, to which a waterglass solution ($Na_2O \cdot 3.5\ SiO_2$), corresponding to 1 g/l of $SiO_2$, i.e., 3.7 g of $SiO_2$/kg of sodium percarbonate has been added are introduced in a continuous flow into the agitator. The soda suspension which has been prepared by adding $Na_2CO_3$, NaCl and sodium hexametaphosphate to a recycled mother liquor containing 1.5 g of $SiO_2$/l is previously adjusted to a pH 10.5 by means of a sodium hydroxide solution. At the same time, an amount of solid sodium chloride sufficient to maintain a concentration of 240 g/l of NaCl is continuously introduced.

A sodium percarbonate suspension, wherein 75% of the crystallizable sodium percarbonate has precipitated, is drawn off continuously from the agitator into a refrigerated agitator in which the temperature is maintained at 10° C. A waterglass solution ($Na_2O \cdot 3.5\ SiO_2$) corresponding to 0.7 g of $SiO_2$/l i.e., 3.3 g of $SiO_2$/kg of sodium percarbonate is added continuously.

Then the crystals are separated from the mother liquor continuously by conveying the crystal suspension to a fully automatic centrifuge via a proportioning vessel. The moist crystal mass is dried in a conventional way. The mother liquor is used for preparing fresh soda suspension. As additional water has been introduced into the process with the diluted hydrogen peroxide solution, a part of the mother liquor is eliminated. The amount of waterglass added during the first and second stages is adjusted with regard to this additional introduction of water in such a way that the desired $SiO_2$ concentration in the mother liquor is maintained.

The end product has an active oxygen content of 13.8% and an $SiO_2$ content of 0.7% and a phosphonic acid content of 0.1%.

After being submitted to the test for determining the stability of the dry material the percarbonate still contains 12.97% of active oxygen, i.e., the test sample has only lost 6% of its active oxygen. A second sample subjected to the above described test for determining the effect of metallic impurities introduced from outside (warm storage test) does not reach a temperature of 100° C, even after 72 hours.

If the production process is repeated under similar conditions, only with the difference that the pH value of the sodium carbonate suspension is adjusted to 11.2, then the resulting percarbonate has an active oxygen content of 13.3%. In the test for determining the stability of the dry material the loss in active oxygen is 25%. If the pH value of the soda suspension is adjusted to 9.8, the resulting product has a finer particle size i.e., it is not as coarse-grained. It has an active oxygen content of 12.9%, which is reduced to 11.2% after submitting the material to the dry stability test, that is, an active oxygen loss of 13% is determined in this test. Both products show a relatively low stability against metallic impurities brought in from outside. According to the above described test the samples reach a temperature of 100° C after 72 hours.

EXAMPLE 2

The procedure of Example 1 is repeated but with the difference that the hydrogen peroxide solution contains no complexing agent for heavy metals, i.e., no phosphonic acid. The end product has an active oxygen content of 13.7% and an $SiO_2$ content of 0.7%. In the test for dry stability, the percarbonate has lost 9% of its active oxygen; the warm storage test gives the same result as in Example 1.

EXAMPLE 3

The same procedure is carried out as in Example 1 except that a waterglass solution corresponding to 0.7 g/l of $SiO_2$, i.e., 2.7 g of $SiO_2$/kg sodium percarbonate is added to the soda suspension, and after 70% of the percarbonate has crystallized, a waterglass solution corresponding to 0.5 g of $SiO_2$/l, i.e., 2.3 g of $SiO_2$/kg of sodium percarbonate is added to the percarbonate suspension. The precipitated sodium percarbonate, after drying, has an active oxygen content of 13.78% and an $SiO_2$ content of 0.5%. In the test for dry stability, there is a loss of 8% of the active oxygen. In the warm storage tests, no difference can be ascertained compared with the product manufactured according to Example 1.

EXAMPLE 4

The process is carried out as described in Example 1 but a waterglass solution corresponding to 2.6 g of $SiO_2/l$, i.e., 8 g of $SiO_2$/kg sodium percarbonate is added to the soda suspension and a waterglass solution corresponding to 2.0 g of $SiO_2/l$, i.e., 7.0 g $SiO_2$/kg sodium percarbonate is added to the percarbonate suspension. The end product has an active oxygen content of 13.72% and an $SiO_2$ content of 1.5%. In the test for dry stability, the percarbonate loses only 8% of its active oxygen content; in the warm storage test the same result as for the product according to Example 1 is obtained.

While the invention has now been described in terms of various preferred process parameters, and exemplified with respect thereto, the skilled artisan will appreciate that various substitutions, changes, omissions, and modifications may be made without departing from the spirit thereof.

What is claimed is:

1. A process for preparing a stabilized crystalline sodium percarbonate of substantially spheroidal crystal form consisting essentially of the steps of:
   a. preparing an aqueous medium containing sodium carbonate and having a pH value of between about 10 and about 11;
   b. adding to the aqueous medium an amount of a water soluble silicate which is equivalent to from about 0.2 to about 0.9% by weight of $SiO_2$ relative to the amount of the sodium percarbonate to be formed during which step the pH value of the aqueous medium is maintained in the range of between about 10 and about 11;
   c. reacting the resulting aqueous medium with an aqueous hydrogen peroxide solution containing a heavy metal complexing agent, whereby a reaction mixture containing sodium percarbonate is formed;
   d. crystallizing only a portion of about 50% to about 90% of the sodium percarbonate within the reaction mixture;
   e. adding to said suspension an amount of a water soluble silicate which is equivalent to from about 0.2 to about 0.8% by weight of $SiO_2$ relative to the total amount of sodium percarbonate and which is sufficient to provide for a total content of silicate in the final crystalline product, equivalent to from about 0.5 to about 1.5% by weight of $SiO_2$ relative to the amount of sodium percarbonate;
   f. crystallizing substantially the remaining portion of the crystallizable sodium percarbonate within said suspension; and,
   g. recovering a crystalline sodium percarbonate of substantially spheroidal crystal form from said suspension.

2. The process as defined in claim 1, wherein the pH value of the aqueous medium prepared in step a) is between about 10.3 and about 10.8.

3. The process as defined in claim 1, wherein the aqueous medium prepared in step a) comprises an aqueous solution of sodium carbonate.

4. The process of claim 1, wherein the aqueous medium prepared in step a) comprises an aqueous sodium carbonate suspension.

5. The process as defined in claim 1, wherein step g) further comprises recovering the mother liquor solution from said suspension.

6. The process as defined in claim 5, wherein the aqueous medium prepared in step a) comprises at least a portion of said mother liquor.

7. The process as defined in claim 1, wherein the pH value of the aqueous medium prepared in step a) is adjusted by adding a sodium hydroxide solution.

8. The process as defined in claim 1, wherein the water soluble silicate is an alkali metal silicate.

9. The process as defined in claim 8, wherein the alkali silicate is a sodium- or potassium waterglass.

10. The process as defined in claim 1, wherein the water soluble silicate is added in form of an aqueous solution.

11. The process as defined in claim 1 wherein the amount of sodium percarbonate crystallized in step d) is between about 70% and 80%.

12. The process as defined in claim 1, wherein the heavy metal complexing agent is selected from the group consisting of phosphonic acids, ethylenediaminetetraacetic acid, its disodium salt and nitrilotriacetic acid.

13. The process as defined in claim 1, wherein step a) further comprises adding a polymeric phosphate to the aqueous medium.

14. The process as defined in claim 1, wherein the amount of water soluble silicate which is added in step e) is sufficient to provide for a total silicate content in the final product equivalent to from about 0.6 to about 0.9% by weight of $SiO_2$ relative to the amount of sodium percarbonate.

15. The process as defined in claim 1, wherein the aqueous sodium carbonate and silicate containing medium and the aqueous hydrogen peroxide solution are simultaneously and continuously introduced into an agitator and the resulting sodium percarbonate suspension is continuously conveyed into a refrigerated agitator after at least 50% of the crystallizable sodium percarbonate has precipitated, an aqueous solution of a water soluble silicate is added continuously to the sodium percarbonate suspension in the refrigerated agitator and the sodium percarbonate suspension is removed continuously from the refrigerated agitator, separating the crystals from the suspension and drying them.

16. A stabilized substantially crystalline sodium percarbonate comprising spheroidal crystals of sodium percarbonate having a silicate content equivalent to 0.5 to 1.5% of $SiO_2$, wherein part of the silicate is provided by water soluble sodium silicate embedded in the inner portion of the crystals and part of the silicate is provided by sparingly soluble polymeric silicic acid incorporated into the outer layer of the crystals.

17. A stabilized substantially crystalline sodium percarbonate prepared according to the process defined in claim 1.

* * * * *